(12) United States Patent
Kawakami

(10) Patent No.: US 9,701,365 B2
(45) Date of Patent: Jul. 11, 2017

(54) BICYCLE SHIFT OPERATING DEVICE

(75) Inventor: Tatsuya Kawakami, Osaka (JP)

(73) Assignee: Shimano Inc., Osaka (JP)

(*) Notice: Subject to any disclaimer, the term of this patent is extended or adjusted under 35 U.S.C. 154(b) by 1110 days.

(21) Appl. No.: 11/965,879

(22) Filed: Dec. 28, 2007

(65) Prior Publication Data

US 2009/0165591 A1  Jul. 2, 2009

(51) Int. Cl.
 *B62M 25/04* (2006.01)
 *B62K 23/06* (2006.01)

(52) U.S. Cl.
 CPC ............ *B62M 25/04* (2013.01); *B62K 23/06* (2013.01); *Y10T 74/20438* (2015.01)

(58) Field of Classification Search
 CPC ............ F16C 1/10; G05G 11/00; G05G 13/00
 USPC .............. 74/502.2, 488, 489, 473.14, 473.15
 See application file for complete search history.

(56) References Cited

U.S. PATENT DOCUMENTS

| | | | |
|---|---|---|---|
| 3,595,351 A | 7/1971 | Ishida | |
| 5,203,213 A * | 4/1993 | Nagano | 74/473.14 |
| 5,921,138 A * | 7/1999 | Kojima et al. | 74/502.2 |
| 6,694,840 B2 * | 2/2004 | Kawakami | 74/502.2 |
| 6,862,948 B1 * | 3/2005 | Calendrille, Jr. | 74/502.2 |
| 7,194,928 B2 | 3/2007 | Kawakami | |
| 2005/0204854 A1 | 9/2005 | Mclaughlin et al. | |
| 2006/0070479 A1 | 4/2006 | Ose | |
| 2007/0068312 A1 | 3/2007 | Sato | |
| 2007/0068313 A1 | 3/2007 | Tsumiyama | |
| 2007/0068316 A1 | 3/2007 | Kawakami et al. | |

FOREIGN PATENT DOCUMENTS

| | | |
|---|---|---|
| EP | 0 124 114 A2 | 11/1984 |
| GB | 645912 | 11/1950 |
| JP | 07-97993 A | 4/1995 |
| WO | WO-2006/091197 A2 | 8/2006 |

OTHER PUBLICATIONS

EP Search Report of corresponding EP Application No. 08 17 1887.6 dated Oct. 29, 2010.

* cited by examiner

*Primary Examiner* — Daniel Yabut
(74) *Attorney, Agent, or Firm* — Global IP Counselors, LLP

(57) ABSTRACT

A bicycle shift operating device basically has a base member, a shift wire take-up element rotatably mounted with respect to the base member and a shifting unit operatively coupled to the shift wire take-up element to selectively rotate the shift wire take-up element in first and second rotational directions about a pivot axis. The shifting unit includes a shift operating member pivotally mounted with respect to the base member along a pivotal path to operate the shift wire take-up element in the first rotational direction in response to pivotal movement of the shift operating member about an operating axis. The shift operating member is movably mounted with respect to the base member along a non-pivotal path to operate the shift wire take-up element in the second rotational direction in response to non-pivotal movement of the shift operating member with respect to the operating axis.

19 Claims, 10 Drawing Sheets

BICYCLE SHIFT OPERATING DEVICE

BACKGROUND OF THE INVENTION

Field of the Invention

This invention generally relates to a bicycle shift operating device. More specifically, the present invention relates to a bicycle shift operating device that includes a shifting unit with a single shift operating member that can be used for both winding and releasing a control wire.

Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets. The sprockets are usually coupled to the front crank and the rear wheel such that a pedaling force from the ride is transferred to the rear wheel via the chain.

In the past, shift operating devices have been utilized that include one or more levers that are pivoted to wind and release an inner wire of a control cable. Alternatively, rotating hand grips have also be utilized to wind and release the inner wire of the control cable. The wires are coupled to the front and rear derailleurs to shift the chain over the various sprockets. These prior shift operating devices can be complicated and expensive to manufacture and assemble. Furthermore, these prior shifting devices are sometimes heavy and/or cumbersome.

In view of the above, there exists a need for a bicycle shift operating device which overcomes the above mentioned problems in the prior art. This invention addresses this need in the art as well as other needs, which will become apparent to those skilled in the art from this disclosure.

SUMMARY OF THE INVENTION

One object of the present invention is to provide a bicycle shift operating device that includes a single shift operating member that can be used for both winding and releasing a control wire with one of the shifting operations being accomplished with a pivotal movement of the shift operating member.

Another object of the present invention is to provide a bicycle shift operating device that is relatively simple and inexpensive to manufacture and assemble.

The foregoing objects can basically be attained by providing a bicycle shift operating device that basically includes a base member, a shift wire take-up element and a shifting unit. The shift wire take-up element is rotatably mounted with respect to the base member in first and second rotational directions about a pivot axis. The shifting unit is operatively coupled to the shift wire take-up element. The shifting unit includes a shift operating member pivotally mounted with respect to the base member along a pivotal path to operate the shift wire take-up element in the first rotational direction in response to pivotal movement of the shift operating member about an operating axis. The shift operating member is movably mounted with respect to the base member along a non-pivotal path to operate the shift wire take-up element in the second rotational direction in response to non-pivotal movement of the shift operating member with respect to the operating axis.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
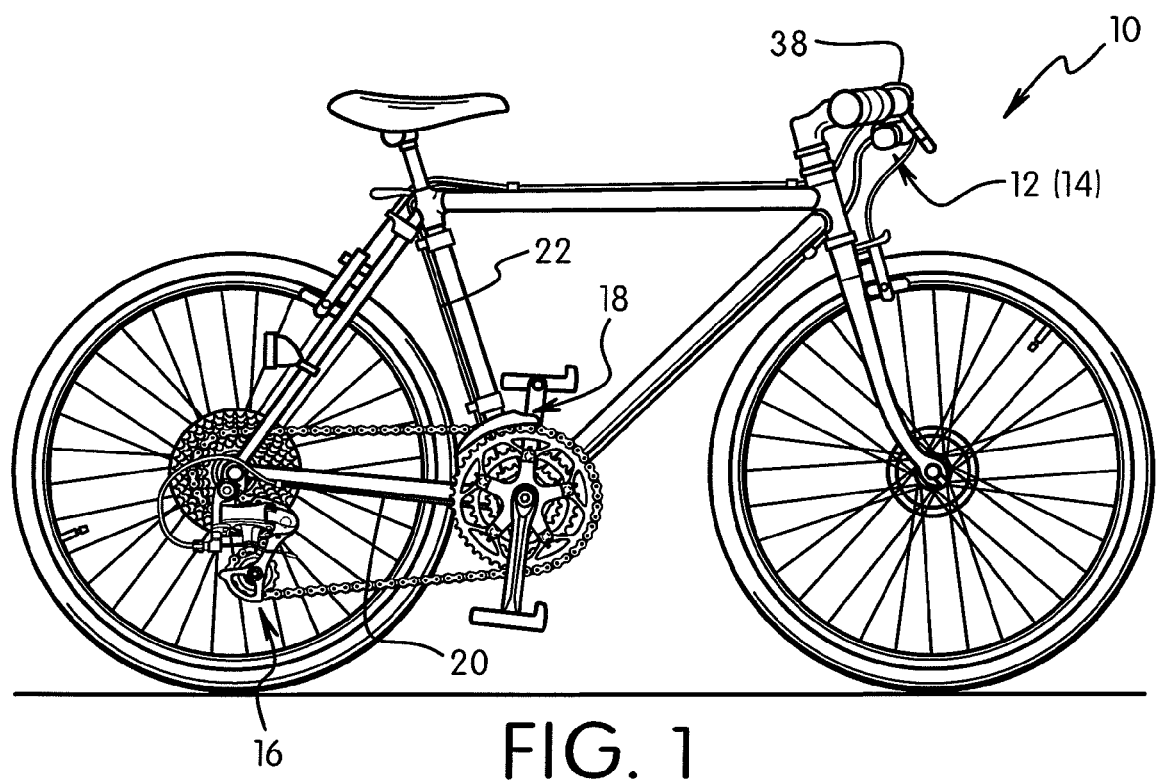
FIG. 1 is a side elevational view of a bicycle with a pair of shift operating devices coupled thereto in accordance with a first embodiment.

Referring initially to FIG. 1, a bicycle 10 is illustrated that is equipped with a pair of bicycle shift operating devices 12 and 14 in accordance with a first embodiment. The bicycle shift operating device 12 is a right hand side control device operated by the rider's right hand to operate a rear derailleur 16, while the bicycle shift operating device 14 is a left hand side control device operated by the rider's left hand to operate a front derailleur 18. In the illustrated embodiment, the bicycle shift operating device 12 is operatively coupled to the rear derailleur 16 via a shift control cable 20. The bicycle shift operating device 14 is operatively coupled to the front derailleur 18 via a shift control cable 22. Preferably, the shift control cables 20 and 22 are conventional bicycle control cables that have an outer casing the covers an inner wire. In other words, each of the shift control cables 20 and 22 basically includes an inner wire slidably received within an outer casing. Alternatively, the bicycle control devices 12 and 14 can be switched so that the rider can operate the rear and front derailleurs 16 and 18 with opposite hands as needed and/or desired.

In the illustrated embodiment, the right and left hand bicycle shift operating devices 12 and 14 are essentially identical in operation, except that they are mirror images of each other and the number of shift positions are different. In other words, the left hand side shift operating device 14 is substantially identical to the right hand side shift operating device 12, except for the shifting unit (not shown) of the left hand side shift operating device 14 has been modified to be a mirror image and to decrease the number of gears that can be shifted. Thus, only the right hand side bicycle control device 12 will be discussed and illustrated herein.

Figure 2:
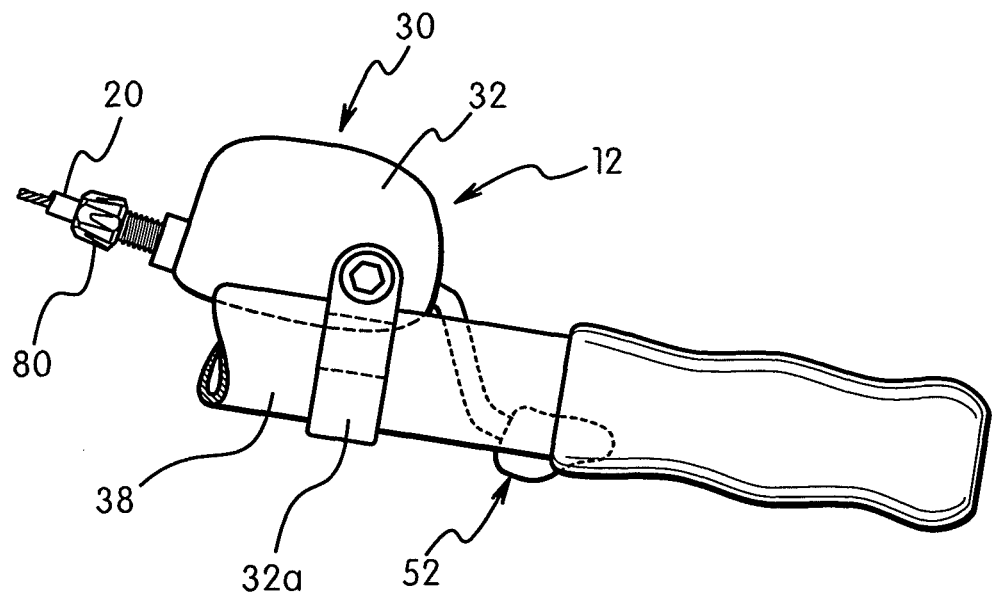
FIG. 2 is an enlarged top plan view of the right shift operating device in accordance with the first embodiment.
Figure 3:
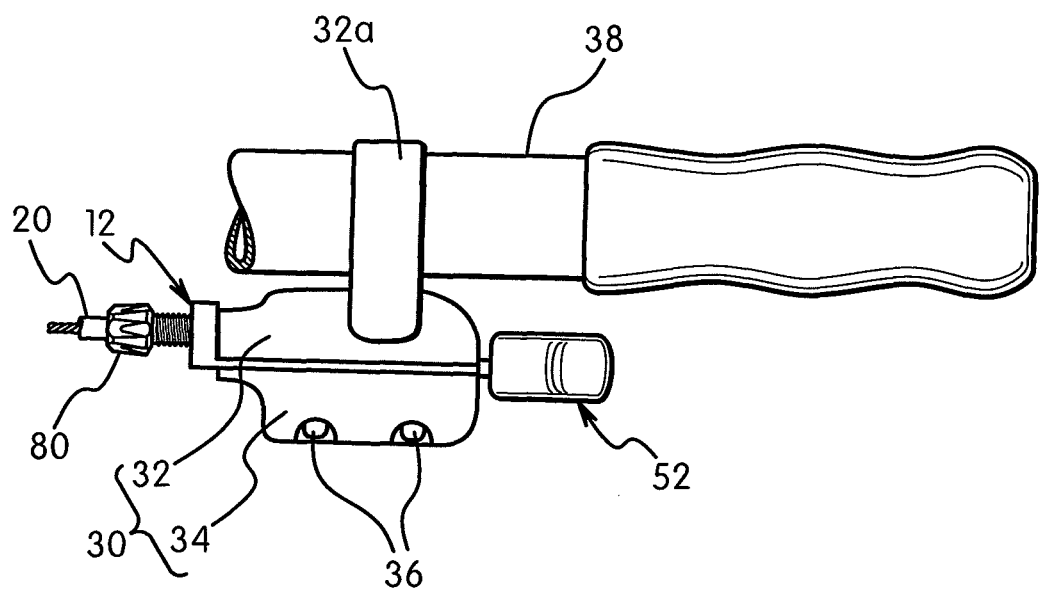
FIG. 3 is a rear elevational view of the right shift operating device illustrated in FIG. 2 in accordance with the first embodiment.

As seen in FIGS. 2 and 3, the bicycle shift operating device 12 has a housing 30 with an upper cover 32 and a lower cover 34 that are coupled together by three screws 36 (only two shown in FIG. 3). The upper cover 32 is provided with a bicycle handlebar clamping member 32a for mounting the bicycle shift operating device 12 on a bicycle handlebar 38 in a conventional manner. The upper and lower covers 32 and 34 are constructed of a hard rigid material such as a hard plastic or a metallic material. The clamping member 32a can be integrally formed with the upper cover 32, as illustrated, or can be a separate member that is attached to the upper cover 32 by a fastener, if needed and/or desired.

Figure 4:
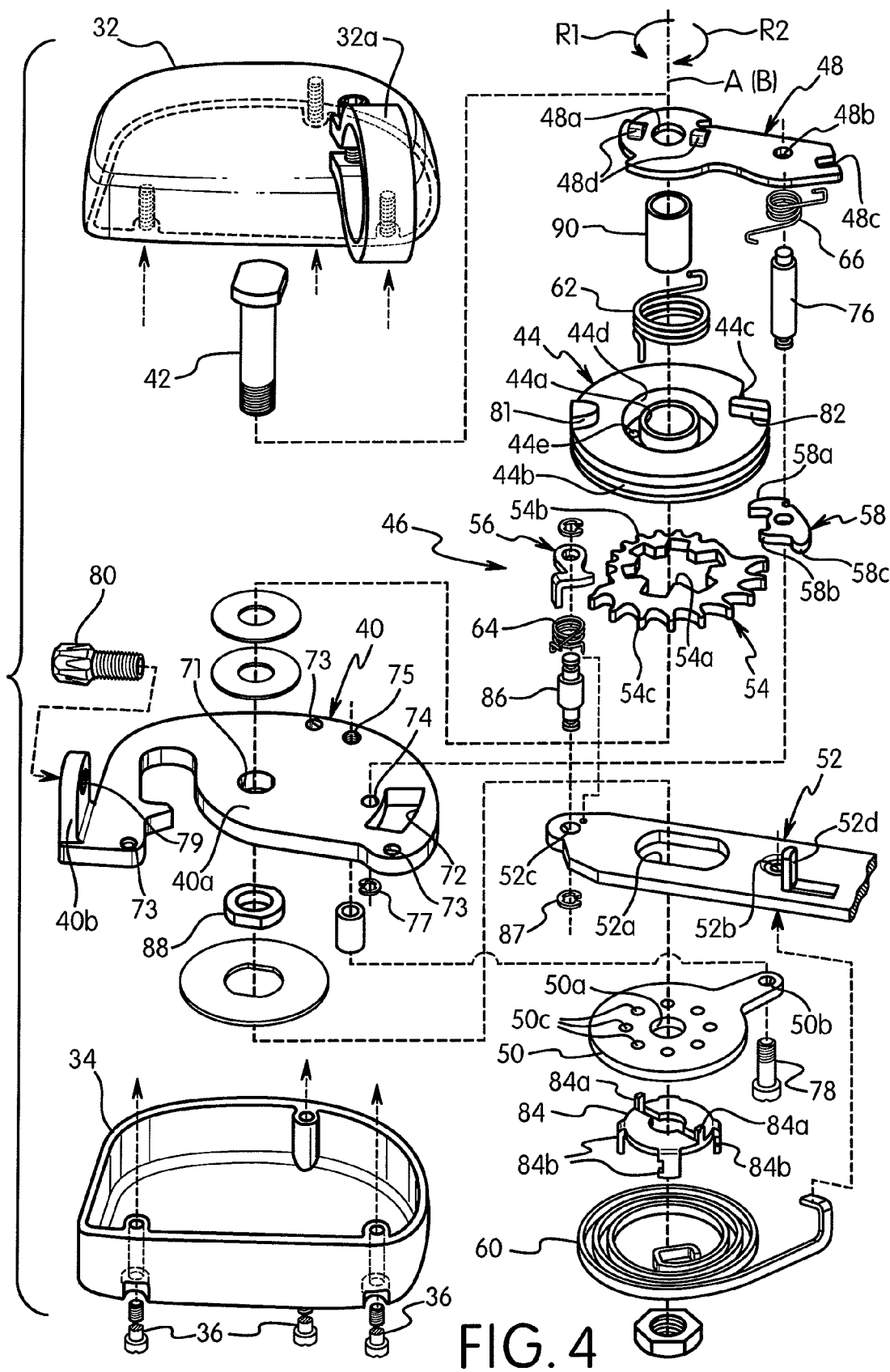
FIG. 4 is an exploded perspective view of the right shift operating device illustrated in FIGS. 2 and 3 in accordance with the first embodiment.

As seen in FIG. 4, inside of the housing 30 is a bicycle shifting mechanism is provided that basically includes a base member 40, a shift unit axle 42, a shift wire take-up element 44 and a shifting unit 46. The shifting unit 46 is operatively coupled to the shift wire take-up element 44 to selectively rotate the shift wire take-up element 44 in the first and second rotational directions R1 and R2 as explained below. The shift wire take-up element 44 and the shifting unit 46 are attached to the base member 40 by the shift unit axle 42 in conjunction with a first retaining plate 48 and a second retaining plate 50.

The shifting unit 46 basically includes a shift operating member 52, a ratchet member 54, a winding pawl 56, and a release pawl 58. The shifting unit 46 further includes a lever biasing element or return spring 60, a main biasing element or spring 62, a winding pawl spring 64 and a release pawl spring 66. The main spring 62 is configured and arranged for urging both the shift wire take-up element 44 and the ratchet member 54 in a wire releasing direction. The winding pawl spring 64 is configured and arranged for urging the winding pawl 56 into engagement with the ratchet member 54 when the shift operating member 52 is in a rest position. The release pawl spring 66 is configured and arranged for urging the release pawl 58 into engagement with the ratchet member 54 when the shift operating member 52 is in a rest position.

The shift operating member 52 is a shift lever that performs both winding and release of the shift wire take-up element 44. In particular, rotating the shift operating member 52 about the shift unit axle 42 performs a wire winding operation, while pushing the shift operating member 52 toward the shift unit axle 42 of the shift operating member 52 performs a wire releasing operation.

As seen in FIG. 4, the base member 40 is preferably constructed of a hard rigid material such a metallic material. The base member 40 is the main support for the shift wire take-up element 44 and the shifting unit 46. Preferably, the base member 40 is constructed of a lightweight rigid material such as deformed sheet metal or cast aluminum. The base member 40 is located between the first retaining plate 48 and the second retaining plate 50. The base member 40 basically has a base portion 40a and a cable attachment flange 40b.

Figure 6:
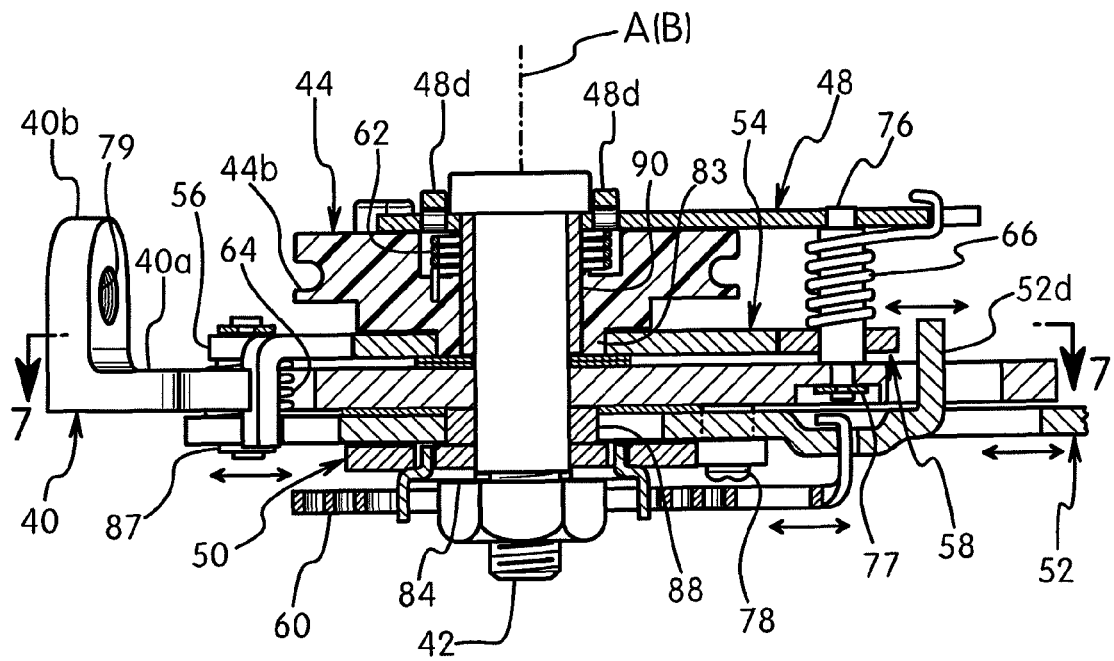
FIG. 6 is a cross sectional view of the right shift operating device illustrated in FIGS. 2 to 5 as seen along section line 6-6 of FIG. 5, with the main shift axle shown in elevation and the cable adjusting nut removed.

As seen in FIG. 4, the base portion 40a of the base member 40 has a main axle hole 71, a control slot 72, three cover mounting holes 73, a release pawl supporting hole 74 and a threaded screw hole 75. The main axle hole 71 receives the shift unit axle 42 therethrough for operatively mounting the shift wire take-up element 44 on the upper side and for operatively mounting the shift operating member 52 on the lower side. The control slot 72 is an arcuate slot that controls the movement of the shift operating member 52. The cover mounting holes 73 receive the screws 36 therethrough for securing the upper and lower covers 32 and 34 together. The release pawl supporting hole 74 has a pivot pin 76 retained therein by a clip 77 as seen in FIG. 6. The pivot pin 76 pivotally supports the release pawl 58. The threaded screw hole 75 threadedly receives a bolt 78 for fixing the second retaining plate 50 to the lower side of the base member 40.

Figure 5:
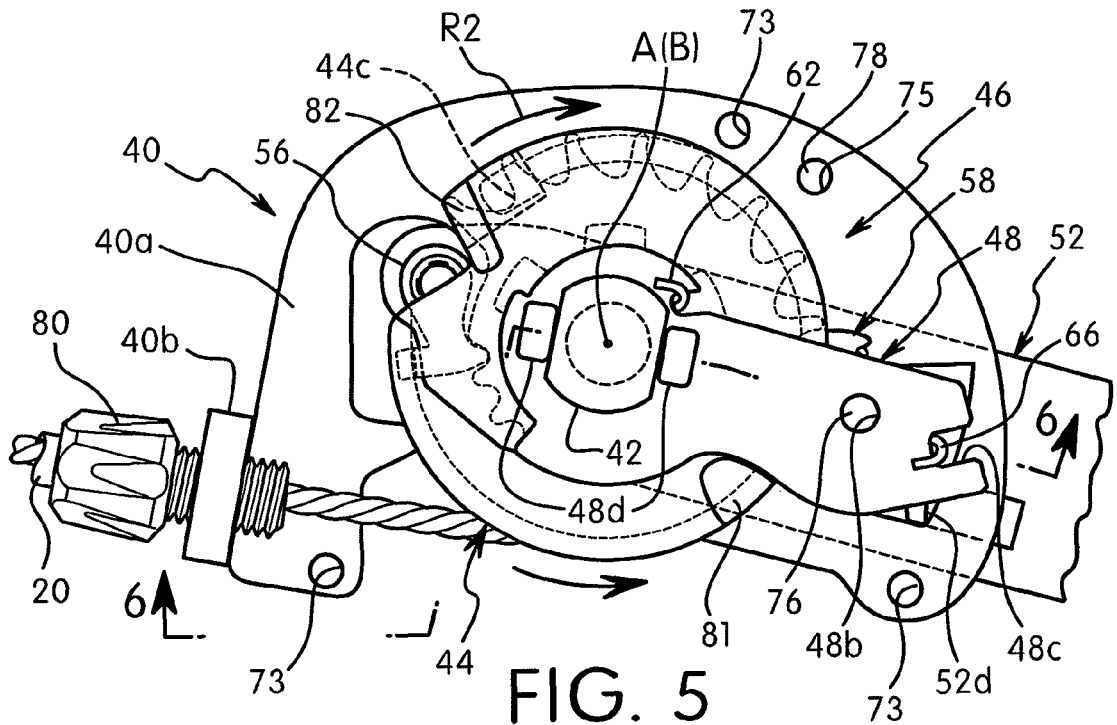
FIG. 5 is an enlarged top plan view of the right shift operating device illustrated in FIGS. 2 to 4 with the covers removed to illustrated the shifting unit in accordance with the first embodiment.

As seen in FIGS. 5 and 6, the cable attachment flange 40b of the base member 40 has a threaded screw hole 79 for threadedly receiving a cable adjusting nut 80. The cable adjusting nut 80 receives the shift control cable 20.

In the illustrated embodiment, the shift unit axle 42 is formed by a bolt and a nut. The shift unit axle 42 rotatably supports the shift wire take-up element 44 on the upper side of the base member 40. In particular, the shift wire take-up element 44 is rotatably mounted with respect to the base member 40 in the first and second rotational directions R1 and R2 about a main pivot axis A. The shift unit axle 42 also pivotally and slidably supports the shift operating member 52 on the lower side of the base member 40 about an operating axis B. Thus, the shift unit axle 42 defines the main pivot axis A of the shift wire take-up element 44 and the operating axis B of the shift operating member 52. In other words, in the illustrated embodiment, the operating axis B of the shift operating member 52 is coincident with the pivot axis A of the shift wire take-up element 44. As understood from FIG. 6, the main pivot axis A is stationary with respect to the base member 40, and a center of rotation of the shift wire take-up element 44 is coincident with the main pivot axis A as the shift wire take-up element 44 rotates relative to the base member 40.

The shift wire take-up element 44 is preferably a winding member that is integrally formed as a one-piece unitary member. Moreover, the shift wire take-up element 44 is preferably constructed of a lightweight rigid material such as hard plastic. The shift wire take-up element 44 basically has a central bore 44a, an inner wire receiving groove 44b and an inner wire nipple receiving recess 44c. The central bore 44a receives the shift unit axle 42 for rotatably supporting the shift wire take-up element 44. A tubular spacer 90 is disposed in the central bore 44a of the shift wire take-up element 44. The tubular spacer 90 is preferably a tubular member constructed of lightweight rigid material with one end contacting the lower surface of the first retaining plate 48 and the other end contacting one of a pair of washers (optional) located on the upper surface of the base member 40. The tubular spacer 90 maintains the appropriate spacing between the base member 40 from the first retaining plate 48 so that the shift wire take-up element 44 can freely rotate on the shift unit axle 42, i.e., so that the shift unit axle 42 does not apply an axial force on the shift wire take-up element 44. The inner wire nipple receiving recess 44c forms an attachment point for the shift control cable 20. As seen in FIG. 4, the upper surface of the shift wire take-up element 44 has an annular recess 44d for receiving a coiled portion of the main spring 62. A hole 44e is provided in the annular recess 44d for attaching one end of the main spring 62 thereto. In particular, the main spring 62 is preferably a metal torsion spring that is arranged to apply an urging force on the shift wire take-up element 44 and the ratchet member 54 to rotate about the shift unit axle 42 in the second rotational direction R2. The main spring 62 basically includes a first end engaged with a notch in the first retaining plate 48 (FIG. 5), a second end engaged with the shift wire take-up element 44 (FIG. 6) and a coiled portion located on the shift axle 42 (FIG. 6). The main spring 62 urges the shift wire take-up element 44 about the pivot axis A in the second rotational direction R2 so that the shift wire take-up element 44 automatically rotates in the wire releasing direction when a releasing operation is performed by pushing the shift operating member 52 towards the operating axis B.

The upper surface of the shift wire take-up element 44 has a first projection 81 and a second projection 82. These projections 81 and 82 act as end stops for the rotational movement of the shift wire take-up element 44. In particular, the first projection 81 contacts the first retaining plate 48 when the shift wire take-up element 44 is in a fully wound position as seen in FIG. 5. On the other hand, the second projection 82 will contact the first retaining plate 48 when the shift wire take-up element 44 is in a fully unwound position (e.g., see, FIG. 10).

As best seen in FIG. 6, the lower surface of the shift wire take-up element 44 has a non-circular projection 83 surrounding the central bore 44a. The non-circular projection 83 engages the ratchet member 54 to non-rotatably coupled to the ratchet member 54 to the shift wire take-up element 44. Thus, the ratchet member 54 rotates with the shift wire take-up element 44 as a unit. As explained below, the rotational movement of the shift wire take-up element 44 is controlled by the shifting unit 46.

As seen in FIG. 4, the first retaining plate 48 is preferably a plate member constructed of a hard rigid material such as a metallic material. The first retaining plate 48 has a first hole 48a for receiving the shift unit axle 42 and a second hole 48b for receiving the pivot pin 76 that pivotally supports the release pawl 58. A notch 48c is provided for receiving one end of the release pawl spring 66. Optionally, the upper surface of the first retaining plate 48 has a pair of projections 48d for engaging a head portion of the shift unit axle 42.

The second retaining plate 50 is preferably a plate member constructed of a hard rigid material such as a metallic material. The second retaining plate 50 has a first hole 50a for receiving the shift unit axle 42 and a second hole 50b for receiving the bolt 78 to fix the second retaining plate 50 to the lower side of the base member 40. The second retaining plate 50 also has a plurality of small retaining bores 50c located in a circular pattern about the first hole 50a. These small retaining bores 50c are configured to receive a pair of projections 84a of a nut plate 84 to selectively hold the nut plate 84 in one of a plurality of predetermined orientations, which depending upon which of the small retaining bores 50c receives the projections 48a of the nut plate 84. The nut plate 84 has a plurality of flanges 84b that project away from the second retaining plate 50 such that one of the flanges 84b receives one end of the return spring 60.

The shift operating member 52 is a trigger action lever that is biased to a single prescribed rest position by the return spring 60 after performing a shifting operation (i.e., either a wire winding operation or a wire releasing operation). The return spring 60 is preferably a spiral torsion spring with one end coupled to the shift operating member 52 and a second end coupled to the base member 40 (i.e., via the nut plate 84 and the second retaining plate 50 that is fixed to the base member 40 by bolt 78).

The shift operating member 52 is preferably a plate member constructed of a hard rigid material such as a metallic material. The shift operating member 52 is pivotally mounted with respect to the base member 40 by the shift unit axle 42. The shift operating member 52 has a main mounting slot or opening 52a, a return spring attachment hole 52b and a winding pawl supporting hole 52c. The main mounting opening 52a receives the shift unit axle 42 therethrough for operatively mounting the shift operating member 52 thereto. The return spring attachment hole 52b receives one end of the return spring 60. The winding pawl supporting hole 52c has a pivot pin 86 retained therein by a clip 87 as seen in FIG. 6. The pivot pin 86 pivotally supports the winding pawl 56. A tubular spacer 88 is disposed in the main mounting opening 52a of the shift operating member 52. The tubular spacer 88 is preferably a tubular member constructed of lightweight rigid material with one end contacting the lower surface of the base member 40 and the other end contacting upper surface of the second retaining plate 50. The tubular spacer 88 maintains the appropriate spacing between the base member 40 from the second retaining plate 50 so that the shift operating member 52 can be freely moved on the shift unit axle 42, i.e., so that the shift unit axle 42 does not apply an axial force on the shift operating member 52.

Figure 7:
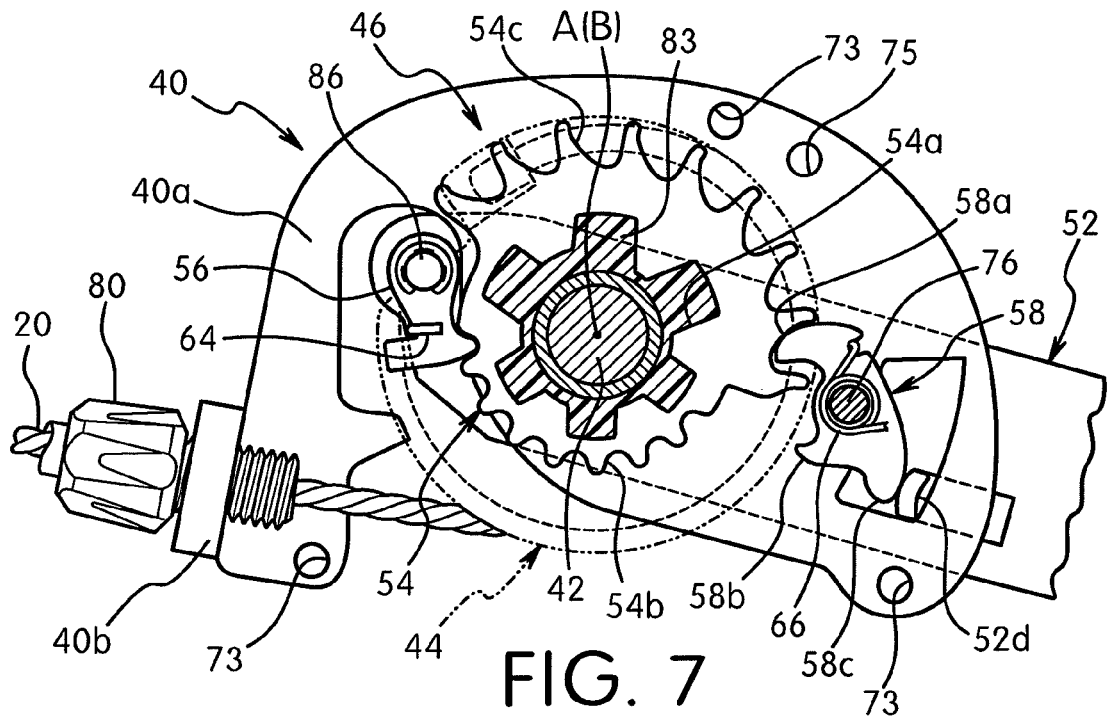
FIG. 7 is a cross sectional view of the right shift operating device illustrated in FIG. 2 as seen along section line 7-7 of FIG. 6 to illustrated the shift wire take-up element in the fully wound position.
Figure 8:
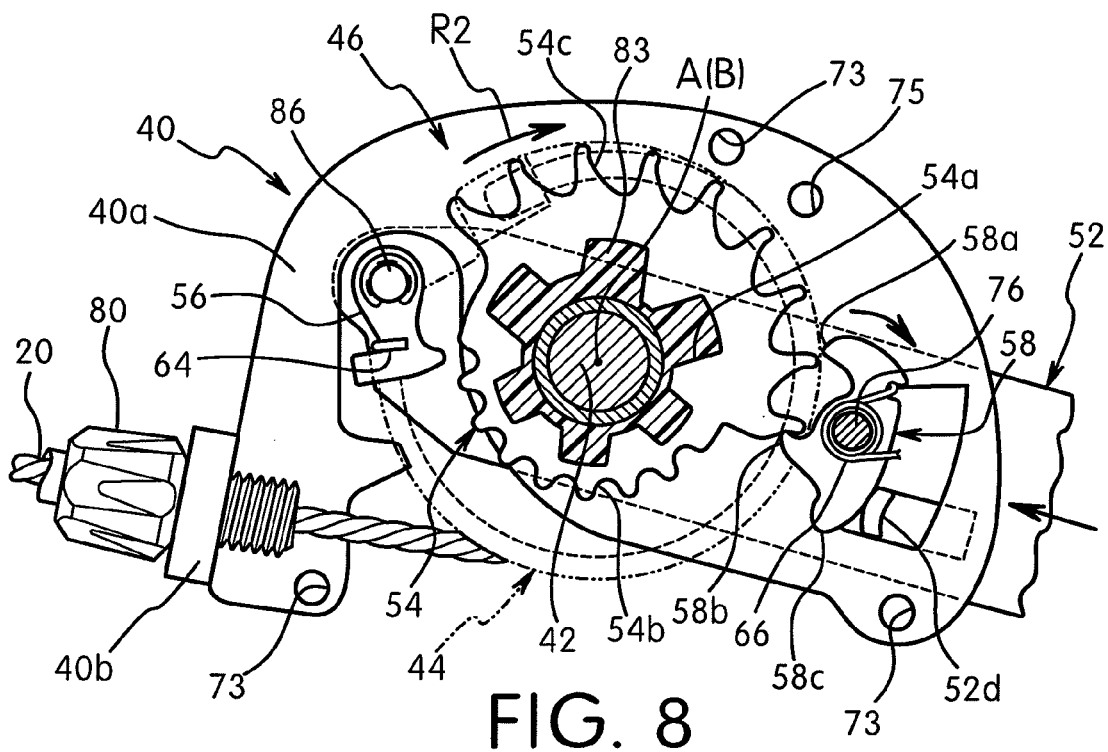
FIG. 8 is a cross sectional view, similar to FIG. 7, of the right shift operating device, but with the shift operating member moved along a linear path to a shifting position to perform a shifting operation, i.e., a wire releasing operation.
Figure 9:
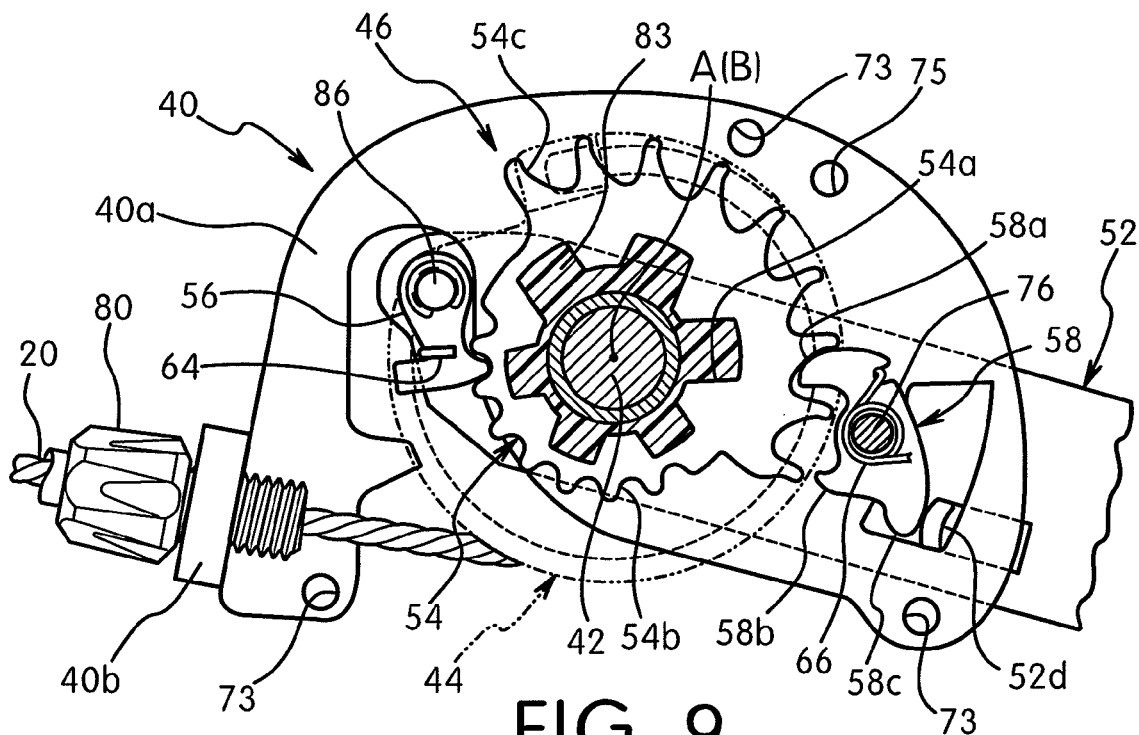
FIG. 9 is a cross sectional view, similar to FIGS. 7 and 8, of the right shift operating device, but with the shift operating member returned to a rest position after the shifting operation, i.e., a wire releasing operation, of FIG. 8.
Figure 10:
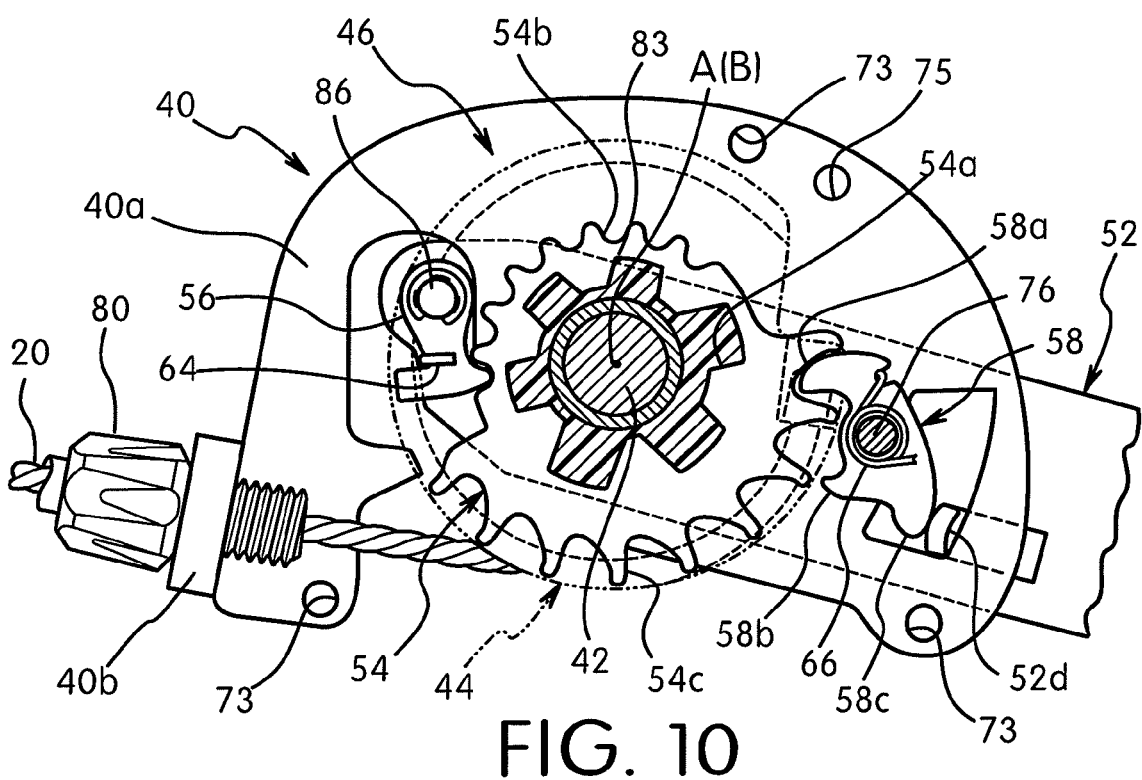
FIG. 10 is a cross sectional view of the right shift operating device illustrated in FIGS. 2 to 6 with the covers removed to illustrated the shift wire take-up element in the fully unwound position.
Figure 11:
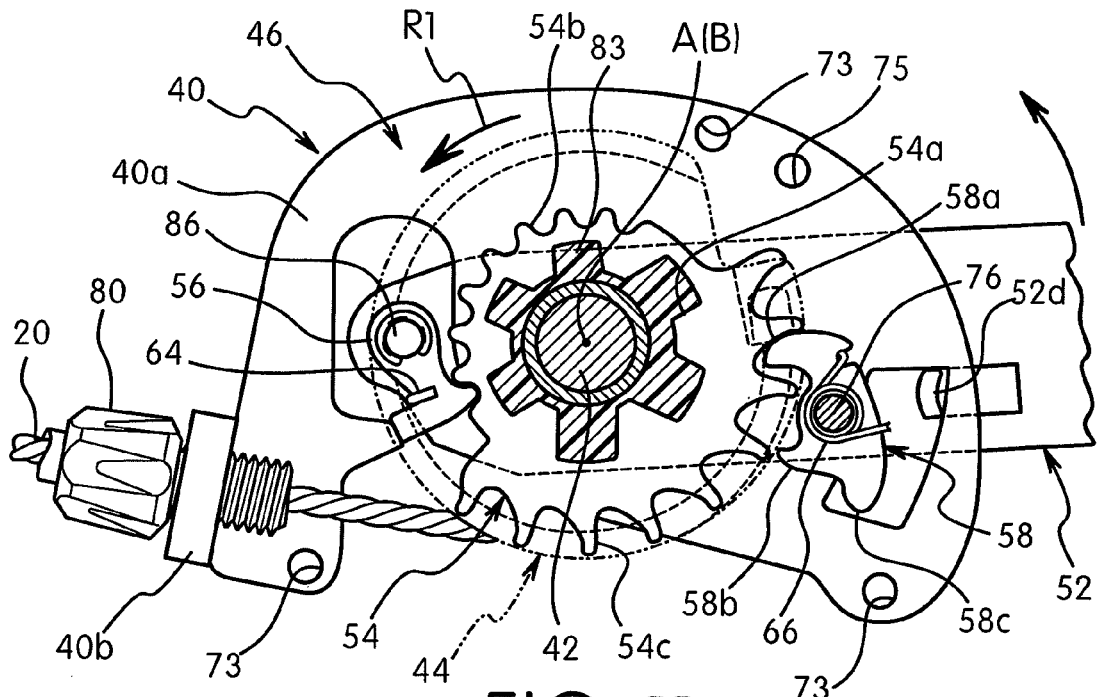
FIG. 11 is a cross sectional view, similar to FIG. 10, of the right shift operating device, but with the shift operating member moved to a shifting position to perform a shifting operation, i.e., a wire winding operation.
Figure 12:
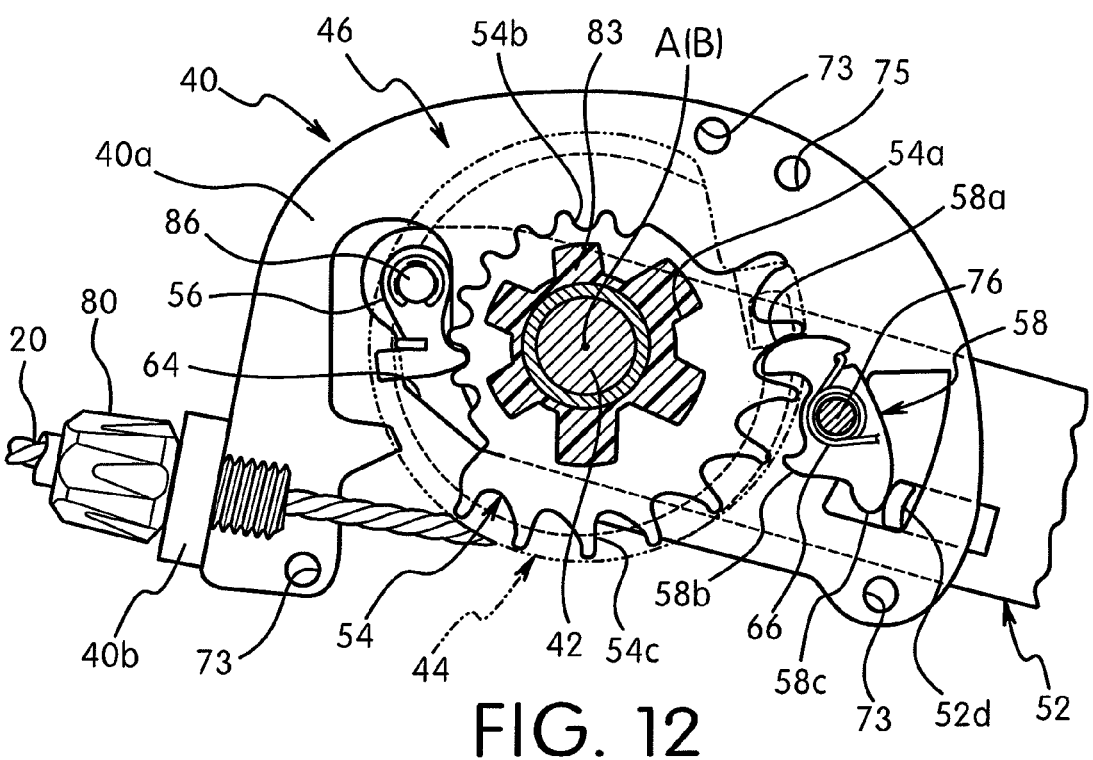
FIG. 12 is a cross sectional view, similar to FIGS. 10 and 11, of the right shift operating device, but with the shift operating member returned to a rest position after the shifting operation, i.e., a wire winding operation, of FIG. 11.
Figure 13:
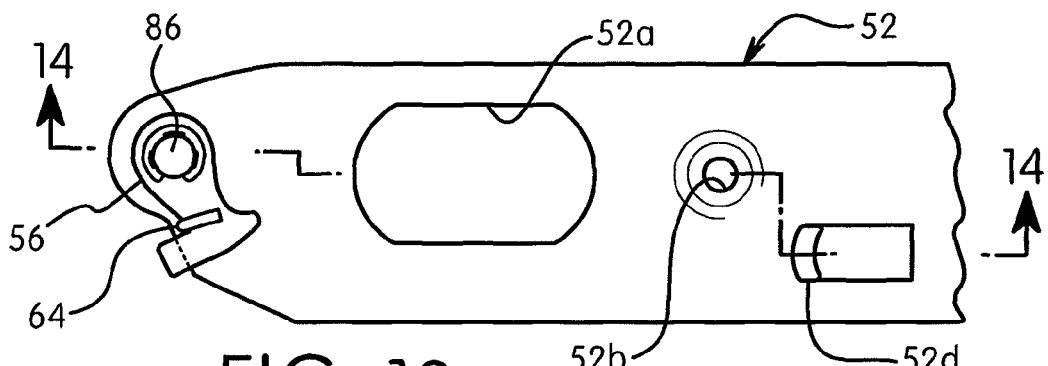
FIG. 13 is a top plan view of a part of the shift operating member with the winding pawl thereon.
Figure 14:
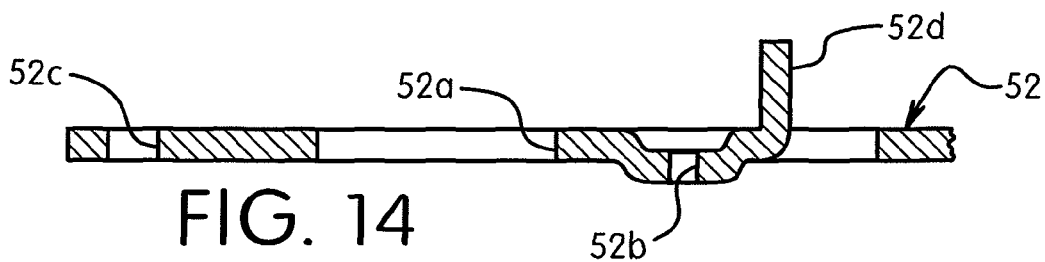
FIG. 14 is a cross sectional view of the shift operating member as seen along section line 14-14 of FIG. 13.
Figure 15:
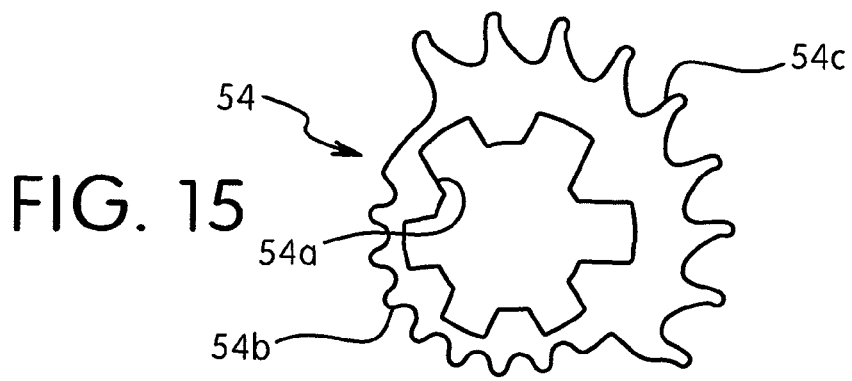
FIG. 15 is a top plan view of the ratchet member for the shifting unit illustrated in FIGS. 4 and 5.
Figure 17:
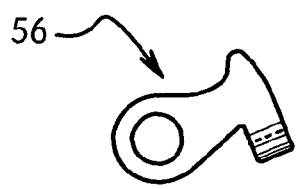
FIG. 17 is a side elevational view of the winding pawl illustrated in FIG. 16.
Figure 18:
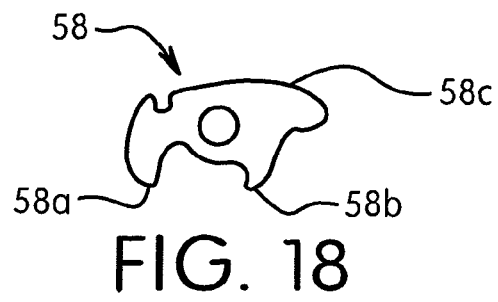
FIG. 18 is a top plan view of the release pawl for the shifting unit illustrated in FIGS. 4 and 5.
Figure 16:
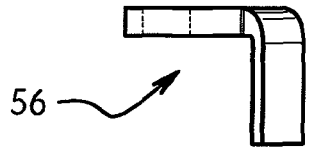
FIG. 16 is a top plan view of the winding pawl for the shifting unit illustrated in FIGS. 4 and 5.
Figure 19:
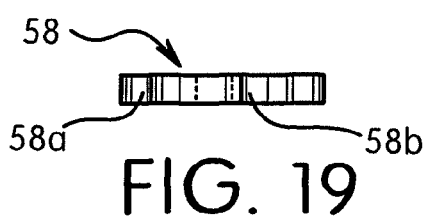
FIG. 19 is a side elevational view of the release pawl illustrated in FIG. 17.

Thus, the shift operating member 52 can freely move along a pivotal movement path to operate the shift wire take-up element 44 in the first rotational direction R1 in response to pivotal movement of the shift operating member 52 about the operating axis B. Also the shift operating member 52 is movably mounted with respect to the base member 40 along a non-pivotal movement path to operate the shift wire take-up element 44 in the second rotational direction R2 in response to non-pivotal movement of the shift operating member 52 with respect to the operating axis B. In particular, as seen in FIGS. 7, 8 and 9, the shift operating member 52 is linearly slidable with respect to the base member 40 from a rest position (FIG. 7) to an operated position (FIG. 8) and then back to the rest position with the shift operating member 52 only moving in the non-pivotal movement path (e.g., linear path). As can be seen in FIG. 8, the non-pivotal movement path of the shift operating member 52 intersects with the operating axis B of the shift operating member 52 as the shift operating member 52 moves between the rest position (FIGS. 7 and 9) and the operated position (FIG. 8) along the non-pivotal movement path. The shift operating member 52 is movable inwardly from the rest position towards the operating axis B with respect to the base member 40 to perform a shifting (wire releasing) operation. As shown in FIGS. 10, 11 and 12, the shift operating member 52 moves with respect to the base member 40 in a single progressive stroke from the rest position (FIG. 10) to a first operating position (FIG. 11) along only the pivotal movement path (i.e., not along the non-pivotal movement path) and operates the shifting unit to perform a first shift (wire winding) operation in which the shift wire take-up element 44 rotates in the first rotational direction R1. In addition, as shown in FIGS. 7, 8 and 9, the shift operating member 52 moves with respect to the base member 40 in a single progressive stroke from the rest position (FIG. 7) to a second operating position (FIG. 8) along only the non-pivotal movement path (i.e., not along the pivotal movement path) and then back to the rest position (FIG. 9) and operates the shifting unit to perform a second shift (wire releasing) operation in which the shift wire take-up element 44 rotates in the second rotational direction R2. As clearly seen in FIGS. 8 to 12, the pivotal movement path and the non-pivotal movement path are distinct movement paths.

The shift operating member 52 also has an operating tab 52d that is bent upwardly to extend through the control slot 72 for actuating the release pawl 58. In particular, when the shift operating member 52 is pushed in a linear motion towards the operating axis B, the operating tab 52d contacts the release pawl 58 to rotate the release pawl 58 against the biasing force of the release pawl spring 66. Thus, this movement of the release pawl 58 causes the shift wire take-up element 44 and the ratchet member 54 to rotate in the second rotational direction R2 for one shift position under the biasing force of the main spring 62.

The ratchet member 54 is preferably a thin flat plate member. Preferably, the ratchet member 54 is constructed of a lightweight rigid material such as sheet metal. The ratchet member 54 basically includes a splined central opening 54a, a plurality of winding teeth 54b and a plurality of positioning teeth 54c. As seen FIG. 6, the opening 54a is configured to receive the non-circular projection 83 of the shift wire take-up element 44 to non-rotatably couple the ratchet member 54 to the shift wire take-up element 44 in a predetermined orientation. Thus, the ratchet member 54 is mounted to rotate with the shift wire take-up element 44 in response to the pivotal and non-pivotal movements of the shift operating member 52.

The winding teeth 54b are selectively engaged by the winding pawl 56 to rotate the shift wire take-up element 44 in the first rotational direction R1 in response to the pivotal movement of the shift operating member 52 about the operating axis B. The positioning teeth 54c are selectively engaged by the release pawl 58 to selectively hold and retain the ratchet member 54 and the shift wire take-up element 44 in one of the plurality of shift positions.

The winding pawl 56 is biased to engage one of the winding teeth 54b when the shift operating member 52 is in a rest position. In particular, the winding pawl spring 64 is preferably a metal torsion spring that is arranged to apply an urging force on the winding pawl 56 such that the winding pawl 56 is normally biased to engage one of the winding teeth 54b. The winding pawl 56 is operatively coupled to the shift operating member 52 to selectively engage one of the winding teeth 54b of the ratchet member 54 to rotate the shift wire take-up element 44 in the first rotational direction R1 in response to the pivotal movement of the shift operating member 52 about the operating axis B.

The release pawl 58 is operatively coupled to the shift operating member 52 to selectively engage one of the positioning teeth 54c of the ratchet member 54 to release the shift wire take-up element 44 in the second rotational direction in response to the non-pivotal movement of the shift operating member 52 with respect to the operating axis. The release pawl 58 is biased to engage one of the positioning teeth when the shift operating member 52 is in a rest position. In particular, the release pawl spring 66 is preferably a metal torsion spring that is arranged to apply an urging force on the release pawl 58 such that the release pawl 58 is normally biased to engage one of the positioning teeth 54c.

As seen in FIGS. 7 to 12, the release pawl 58 is pivotally mounted on the pivot pin 76 and basically includes a first stop tooth 58a, a second stop tooth 58b and an actuating projection 58c. The first and second stop teeth 58a and 58b are arranged to engage one of the positioning teeth 54c. In particular, as seen in FIGS. 7 to 9, when the shift operating member 52 is pushed in a linear motion towards the operating axis B, the operating tab 52d contacts actuating projection 58c of the release pawl 58 to rotate the release pawl 58 against the biasing force of the release pawl spring 66. Thus, this movement of the release pawl 58 causes the first stop tooth 58a to disengage from one of the positioning teeth 54c and the second stop tooth 58b to move into engagement with an adjacent one of the positioning teeth 54c. When the first stop tooth 58a is disengaged from the ratchet member 54, the shift wire take-up element 44 and the ratchet member 54 rotate in the second rotational direction R2. The second stop tooth 58b move into engagement with an adjacent one of the positioning teeth 54c to limit rotation of the ratchet member 54 in the second rotational direction R2 so that the shift wire take-up element 44 and the ratchet member 54 only rotate for one shift position under the biasing force of the main spring 62.

Second Embodiment

Figure 20:
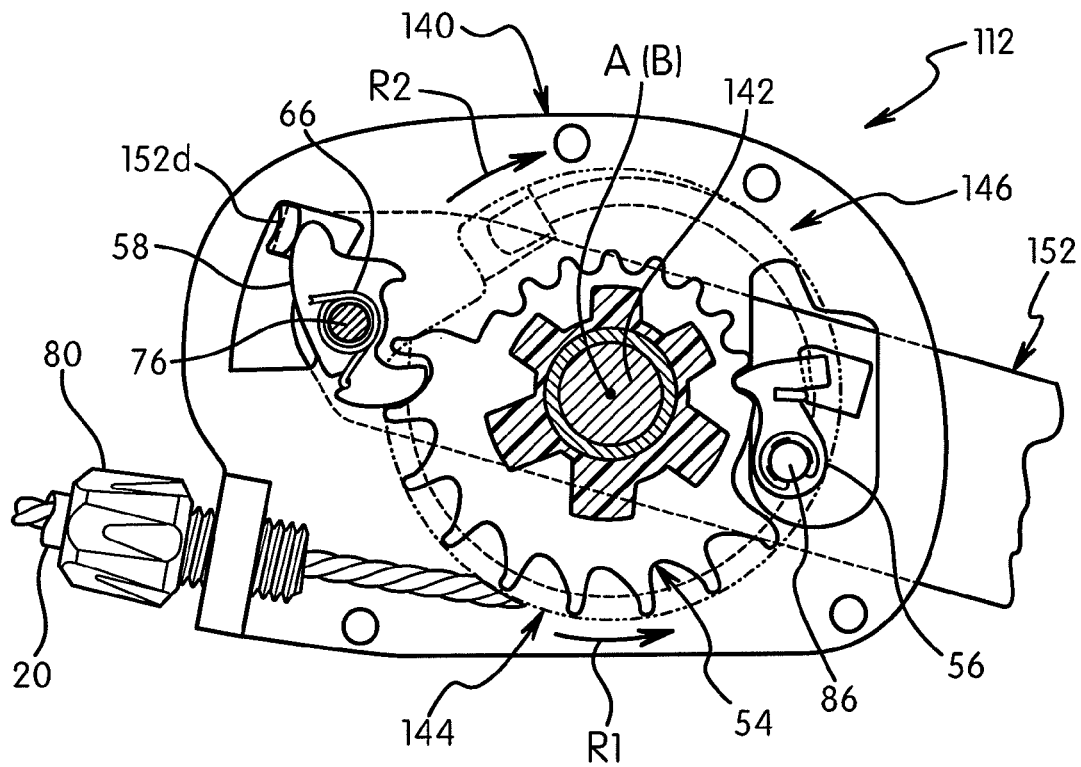
FIG. 20 is a cross sectional view of a right shift operating device in accordance with a second embodiment to illustrated the shift wire take-up element in the fully wound position.
Figure 21:
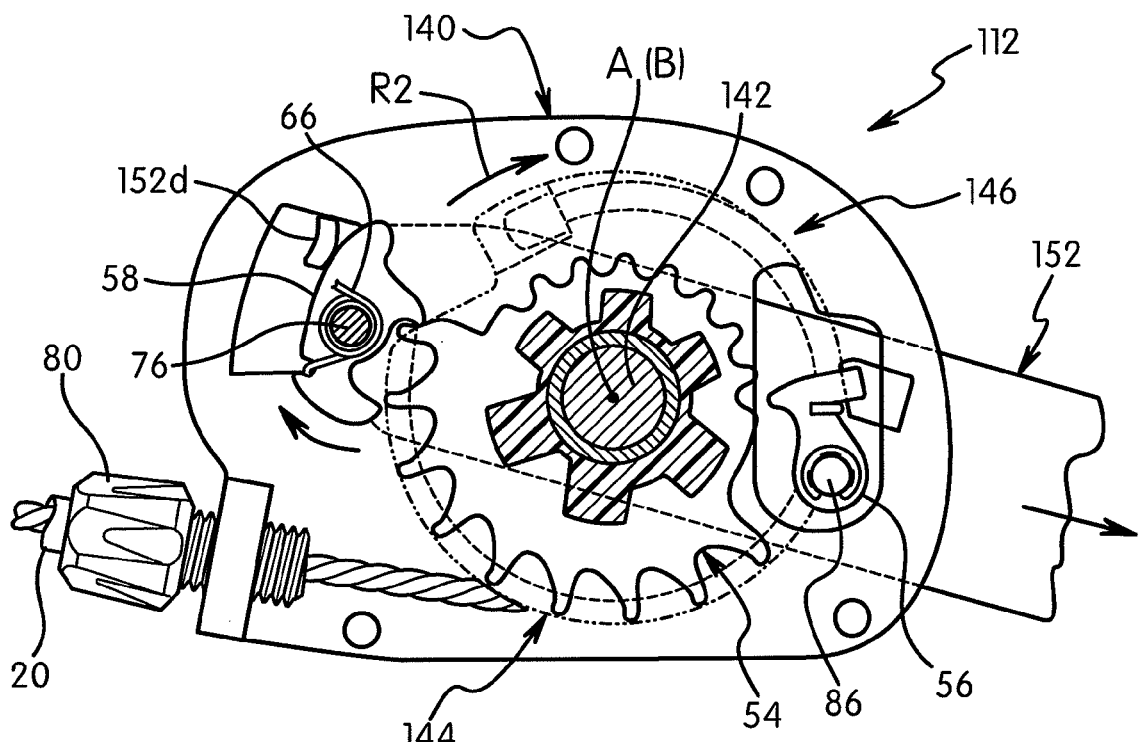
FIG. 21 is a cross sectional view, similar to FIG. 20, of the right shift operating device, but with the shift operating member moved along a linear path to a shifting position to perform a shifting operation, i.e., a wire releasing operation.
Figure 22:
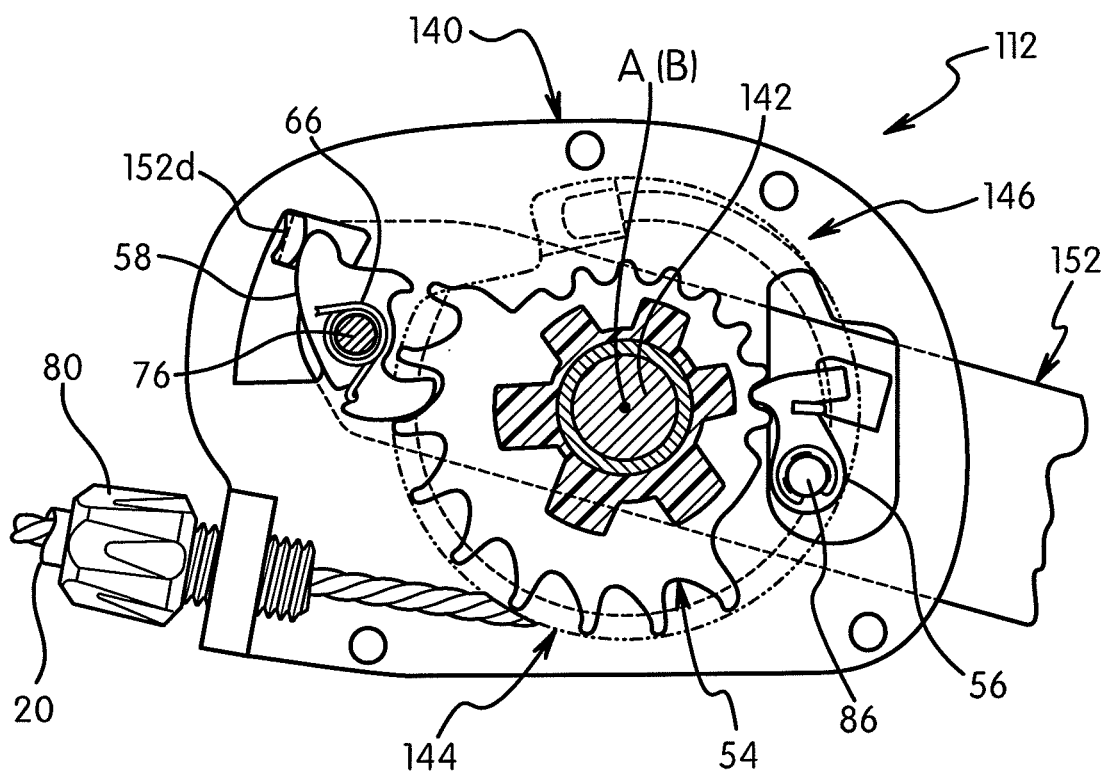
FIG. 22 is a cross sectional view, similar to FIGS. 20 and 21, of the right shift operating device, but with the shift operating member returned to a rest position after the shifting operation, i.e., a wire releasing operation, of FIG. 21.

Referring now to FIGS. 20 to 22, a shift operating device 112 in accordance with a second embodiment will now be explained. Basically, the shift operating device 112 operates in the same way as the shift operating device 12, except that a pulling operation is used to perform a wire releasing operation. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment have been omitted for the sake of brevity.

Here, inside of the housing of the shift operating device 112 is a bicycle shifting mechanism is provided that basically includes a base member 140, a shift unit axle 142, a shift wire take-up element 144 and a shifting unit 146. The shifting unit 146 is operatively coupled to the shift wire take-up element 144 to selectively rotate the shift wire take-up element 144 in the first and second rotational directions R1 and R2 in the same manner as discussed above in the prior embodiment. The base member 140 has been modified with respect to the base member 40 to accommodate new positions for the ratchet member 54, the winding pawl 56 and the release pawl 58. The shift unit axle 142 is identical to the shift unit axle 42 of the prior embodiment. The shift wire take-up element 144 is identical to the shift wire take-up element 44, except that the orientation of the projection of shift wire take-up element 144 for coupling the ratchet member 54 to shift wire take-up element 144 has been changed to accommodate the new positions of the ratchet member 54, the winding pawl 56 and the release pawl 58 on the base member 140. Thus, the shift wire take-up element 144 and the shifting unit 146 are attached to the base member 140 by the shift unit axle 142 in the same manner as discussed above in the prior embodiment, except that the orientations of the parts are different to accommodate a pulling type shifting operation for performing a wire releasing operation.

Accordingly, this embodiment mainly differs from the prior embodiment in that the shift operating device 112 of this embodiment has a modified shift operating member 152 in which a pulling operation is used to perform the wire releasing operation. In particular, as seen in FIG. 21, the shift operating member 152 is linearly slidable with respect to the base member 140. The shift operating member 152 is movable outwardly from the rest position away from the operating axis B with respect to the base member 140 to perform a shifting (wire releasing) operation. In particular, when the shift operating member 152 is pulled in a linear motion away from the operating axis B, an operating tab 152d (similar to the tab 52d of the prior embodiment) contacts the actuating projection 58c of the release pawl 58 to rotate the release pawl 58 against the biasing force of the release pawl spring 66. Thus, this movement of the release pawl 58 causes the first stop tooth 58a to disengage from one of the positioning teeth 54c and the second stop tooth 58b to move into engagement with an adjacent one of the positioning teeth 54c. When the first stop tooth 58a is disengaged from the ratchet member 54, the shift wire take-up element 144 and the ratchet member 54 rotate in the second rotational direction R2. The second stop tooth 58b move into engagement with an adjacent one of the positioning teeth 54c to limit rotation of the ratchet member 54 in the second rotational direction R2 so that the shift wire take-up element 144 and the ratchet member 54 only rotate for one shift position under the biasing force of the main spring 62 (not seen in FIGS. 20 to 22). Thus, the basic shifting operations are the same as the prior embodiment, but for the use of a pulling operation instead of a pushing operation for performing a wire releasing operation.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A bicycle shift operating device comprising:
a base member;
a shift wire take-up element rotatably mounted with respect to the base member in first and second rotational directions about a stationary pivot axis that is stationary with respect to the base member, with the shift wire take-up element having a center of rotation that is coincident with the stationary pivot axis as the shift wire take-up element rotates relative to the base member; and
a shifting unit operably coupled to the shift wire take-up element,
the shifting unit including a shift operating member pivotally mounted with respect to the base member along a pivotal movement path, the shift operating member operably engaging and moving the shift wire take-up element in the first rotational direction as the shift operating member pivots about an operating axis partially defined by a shift unit axle, the shift operating member being slidably mounted with respect to the base member along a non-pivotal movement path, the shift operating member operably engaging and moving the shift wire take-up element in the second rotational direction as the shift operating member moves with respect to the operating axis along the non-pivotal movement path, and the shift operating member sliding on the shift unit axle as the shift operating member moves along the non-pivotal movement path.
2. The bicycle shift operating device according to claim 1, wherein
the operating axis of the shift operating member is coincident with the stationary pivot axis of the shift wire take-up element.

3. The bicycle shift operating device according to claim 1, wherein
the shift operating member is linearly slidable with respect to the base member.

4. The bicycle shift operating device according to claim 1, wherein
the shifting unit further includes a biasing element urging the shift wire take-up element about the stationary pivot axis in the second rotational direction.

5. The bicycle shift operating device according to claim 1, wherein
the shift operating member is movable inwardly from a rest position towards the operating axis with respect to the base member to perform a shifting operation.

6. The bicycle shift operating device according to claim 1, wherein
the shift operating member is a trigger action lever that is biased to a single prescribed rest position after performing a shifting operation.

7. The bicycle shift operating device according to claim 6, wherein
the operating axis of the shift operating member is coincident with the stationary pivot axis of the shift wire take-up element.

8. The bicycle shift operating device according to claim 7, wherein
the shift operating member is linearly slidable with respect to the base member.

9. The bicycle shift operating device according to claim 8, wherein
the shifting unit further includes a biasing element urging the shift wire take-up element about the stationary pivot axis in the second rotational direction.

10. The bicycle shift operating device according to claim 1, wherein
the shift operating member moves with respect to the base member in a single progressive stroke from a rest position to a first operating position along only the pivotal movement path to operate the shifting unit to perform a first shift operation of the shifting unit in which the shift wire take-up element rotates in the first rotational direction, and
the shift operating member moves with respect to the base member in a single progressive stroke from the rest position to a second operating position along only the non-pivotal movement path to operate the shifting unit to perform a second shift operation of the shifting unit in which the shift wire take-up element rotates in the second rotational direction, the pivotal movement path and the non-pivotal movement path being distinct movement paths.

11. The bicycle shift operating device according to claim 10, wherein
the shift operating member includes a mounting slot with the shift unit axle movably disposed in the mounting slot such that the shift unit axle is located in different locations along the mounting slot as the shift operating member moves along the non-pivotal movement path on the shift unit axle.

12. The bicycle shift operating device according to claim 10, wherein
the shift operating member initially moves along the non-pivotal movement path inwardly from a rest position toward the operating axis with respect to the base member and then subsequently moves along the non-pivotal movement path outwardly away from the operating axis to perform a shifting operation of the shifting unit.

13. A bicycle shift operating device comprising:
a base member;
a shift wire take-up element rotatably mounted with respect to the base member in first and second rotational directions about a stationary pivot axis that is stationary with respect to the base member, with the shift wire take-up element having a center of rotation that is coincident with the stationary pivot axis as the shift wire take-up element rotates relative to the base member; and
a shifting unit operably coupled to the shift wire take-up element,
the shifting unit including a shift operating member pivotally mounted with respect to the base member along a pivotal movement path, the shift operating member operably engaging and moving the shift wire take-up element in the first rotational direction as the shift operating member pivots about an operating axis, the shift operating member being movably mounted with respect to the base member along a non-pivotal movement path, the shift operating member further operably engaging and moving the shift wire take-up element in the second rotational direction as the shift operating member moves along the non-pivotal movement path such that the shift operating member initially moves along the non-pivotal movement path outwardly from a rest position away from the operating axis with respect to the base member and then subsequently moves along the non-pivotal movement path inwardly toward the operating axis to perform a shifting operation of the shifting unit.

14. A bicycle shift operating device comprising:
a base member;
a shift wire take-up element rotatably mounted with respect to the base member in first and second rotational directions about a pivot axis; and
a shifting unit operably coupled to the shift wire take-up element,
the shifting unit including a shift operating member pivotally mounted with respect to the base member along a pivotal movement path, the shift operating member operably engaging and moving the shift wire take-up element in the first rotational direction as the shift operating member pivots about an operating axis partially defined by a shift unit axle, the shift operating member being slidably mounted with respect to the base member along a non-pivotal movement path, the shift operating member operably engaging and moving the shift wire take-up element in the second rotational direction as the shift operating member moves with respect to the operating axis along the non-pivotal movement path, and the shift operating member sliding on the shift unit axle as the shift operating member moves along the non-pivotal movement path,
the shifting unit further including
a ratchet member mounted to rotate with the shift wire take-up element in response to the pivotal and non-pivotal movements of the shift operating member,
a winding pawl operably coupled to the shift operating member to selectively engage one of a plurality of winding teeth of the ratchet member to rotate the shift wire take-up element in the first rotational direction in response to the pivotal movement of the shift operating member about the operating axis; and a release pawl operably coupled to the shift operating member to release the shift wire take-up element in the second rotational direction in response to the non-pivotal movement of the shift operating member with respect to the operating axis.

15. The bicycle shift operating device according to claim 14, wherein
the winding pawl is biased to engage one of the winding teeth while the shift operating member is in a rest position.

16. The bicycle shift operating device according to claim 14, wherein
the release pawl is biased to engage one of a plurality of positioning teeth of the ratchet member while the shift operating member is in a rest position.

17. The bicycle shift operating device according to claim 16, wherein
the winding pawl is biased to engage one of the winding teeth while the shift operating member is in a rest position.

18. A bicycle shift operating device comprising:
a base member;
a shift wire take-up element rotatably mounted with respect to the base member in first and second rotational directions about a stationary pivot axis that is stationary with respect to the base member, with the shift wire take-up element having a center of rotation that is coincident with the stationary pivot axis as the shift wire take-up element rotates relative to the base member; and
a shifting unit operably coupled to the shift wire take-up element,
the shifting unit including a shift operating member pivotally mounted with respect to the base member along a pivotal movement path, the shift operating member operably engaging and moving the shift wire take-up element in the first rotational direction as the shift operating member pivots about an operating axis along the pivotal movement path, the shift operating member being movably mounted with respect to the base member along a non-pivotal movement path, the shift operating member further operably engaging and moving the shift wire take-up element in the second rotational direction as the shift operating member moves with respect to the operating axis along the non-pivotal movement path,
the shift operating member being arranged with respect to the shifting unit such that the non-pivotal movement path of the shift operating member intersects with the operating axis of the shift operating member as the shift operating member moves from a rest position to an operated position along the non-pivotal movement path.

19. A bicycle shift operating device comprising:
a base member;
a shift wire take-up element rotatably mounted with respect to the base member in first and second rotational directions about a stationary pivot axis that is stationary with respect to the base member, with the shift wire take-up element having a center of rotation that is coincident with the stationary pivot axis as the shift wire take-up element rotates relative to the base member; and
a shifting unit operably coupled to the shift wire take-up element,
the shifting unit including a shift operating member pivotally mounted with respect to the base member along a pivotal movement path, the shift operating member operably engaging and moving the shift wire take-up element in the first rotational direction as the shift operating member pivots about an operating axis along the pivotal movement path, the shift operating member being movably mounted with respect to the base member along a non-pivotal movement path, the shift operating member further operably engaging and moving the shift wire take-up element in the second rotational direction as the shift operating member moves with respect to the operating axis along the non-pivotal movement path,
the shift operating member being arranged with respect to the shifting unit such that an entirety of the shift operating member moves along both the pivotal movement path and the non-pivotal movement path.

* * * * *